United States Patent [19]

Tuymer

[11] Patent Number: 4,723,572
[45] Date of Patent: Feb. 9, 1988

[54] COMPRESSOR VALVE

[75] Inventor: Walter J. Tuymer, Coral Springs, Fla.

[73] Assignee: Hoerbiger Corporation of America, Inc., Pompano Beach, Fla.

[21] Appl. No.: 75,727

[22] Filed: Jul. 20, 1987

[51] Int. Cl.⁴ .................... F16K 15/08; F16K 15/12
[52] U.S. Cl. ............................ 137/514; 137/516.21
[58] Field of Search ............... 137/514, 516.11–516.23

[56] References Cited

U.S. PATENT DOCUMENTS

| 402,647 | 5/1889 | Beldam | 137/516.21 |
| 2,703,583 | 3/1955 | Seligman | 137/516.21 X |

*Primary Examiner*—Robert G. Nilson
*Attorney, Agent, or Firm*—Watson, Cole, Grindle & Watson

[57] ABSTRACT

A compressor valve comprises a valve seat that includes flow channels therein for the fluid medium, a catcher spaced apart from the valve seat and a valve plate which is movable against the valve seat to block the flow of fluid medium through the valve or away from the valve seat and towards the catcher to allow the fluid medium to flow through the valve. In order to prevent the valve plate from sticking to the stop face of the catcher when a liquid such as a lubricant or coolant is in the valve, protrusions and recesses are provided on the surface of the valve plate which faces the catcher or on the stop face against the valve plate moves when the valve is open, stop face being provided on the catcher itself or by the facing surface of an additional plate positioned between the valve plate and the catcher.

19 Claims, 15 Drawing Figures

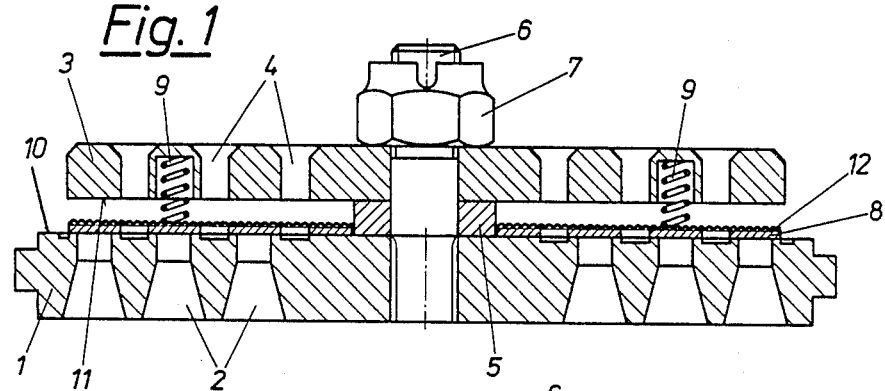
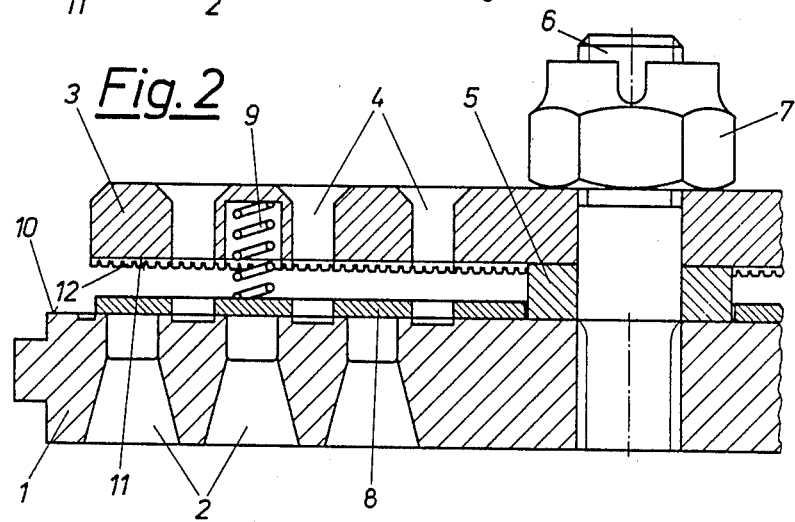
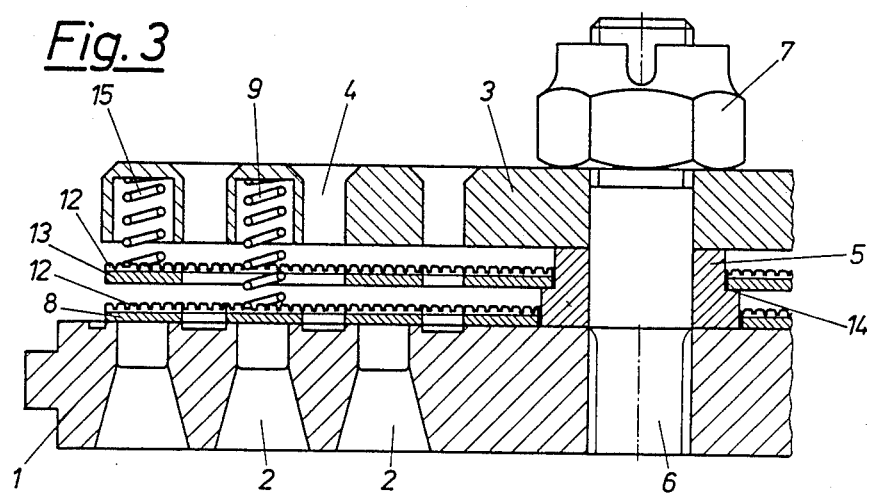

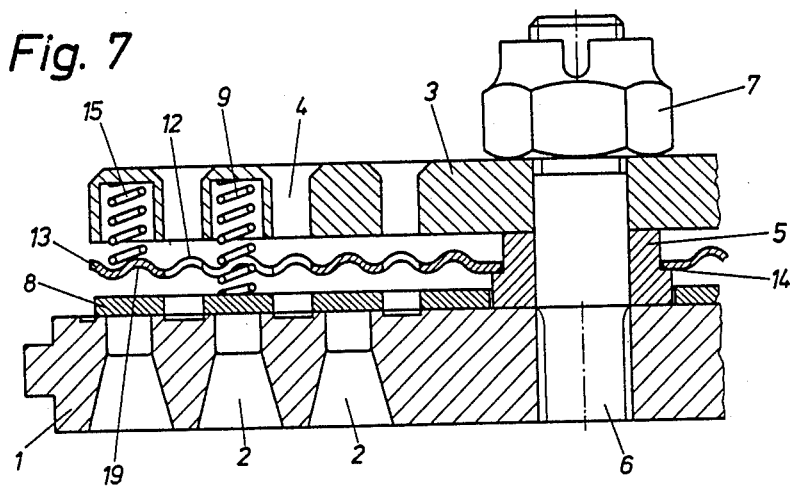
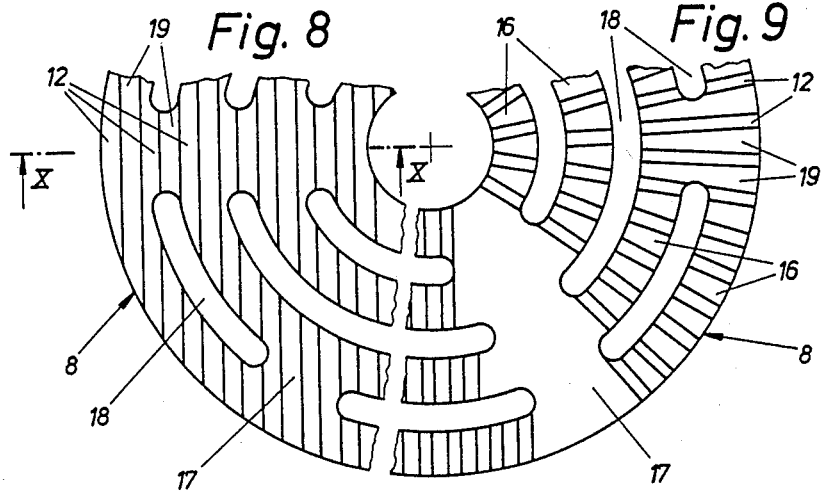
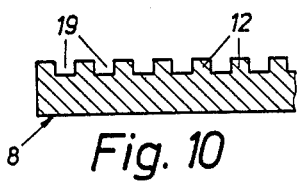
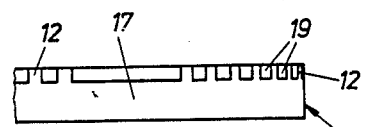

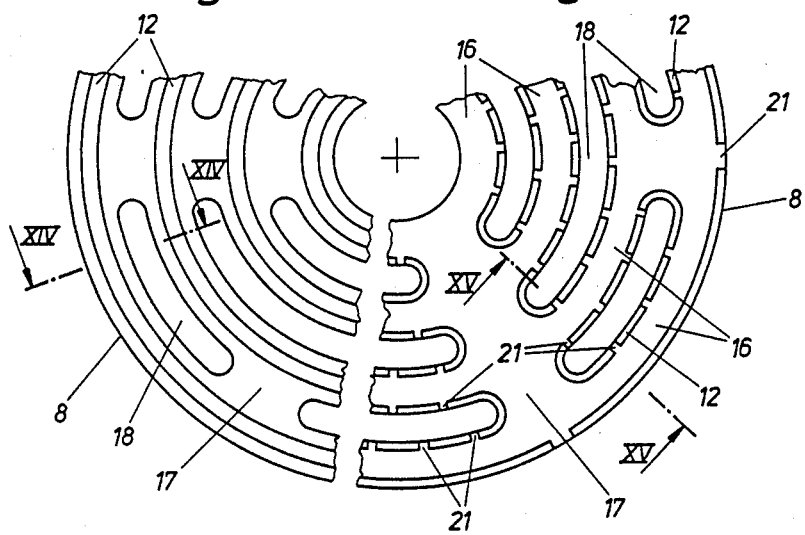

COMPRESSOR VALVE

BACKGROUND OF THE INVENTION

1. Field of the Invention

This invention relates to a compressor valve comprising a valve seat that includes flow channels for the controlled fluid medium and provides a packing surface, a catcher located at a distance from the packing surface of the valve seat, and a valve plate which can be moved back and forth between the packing surface of the valve seat and the catcher to control the flow of fluid medium through the valve.

2. The Prior Art

In conventional compressor valves the plates arranged between the valve seat and the catcher move back and forth during the stroke beat of the compressor, the plates striking both the catcher and the valve seat with relatively high speeds. The greatest stress is put on the valve plate, which is located directly over the valve seat and which controls the openings of the flow channels in the valve seat. The opening motion of the plates, and in particular the valve plate, is dampened by springs that are supported by the catcher and by internal dampening plates that are provided for this purpose. The greatest stress, however, is put on the valve plate during the closing motion because dampening plates or similar elements cannot be inserted between the valve plate and the packing surface of the valve seat.

The so-called closing slaps, which occur as the valve plate strikes the valve seat, depend to a considerable degree on the speed with which the valve plate strikes the packing surface of the valve seat. In order to avoid impact blows that are too hard and to prevent the efficiency of the compressor from deteriorating, the valve plate should move away from the valve seat and open the flow channels therein as soon as the pressure in the cylinder of the compressor has overcome the pressure in the pressure line (during the compression stroke of the compressor), and that as soon as the compression stroke of the compressor is finished, the valve plate should move back against the valve seat to close the flow channels therein. The closing springs of the valves, which are supported by the catcher and which act on the valve plate, not only dampen the opening motion but also have the task of activating the closing motion at the right time.

As experience has shown, however, liquid can collect from time to time between the stop face of the catcher and the individual plates of the valve, especially in compressors which are lubricated with oil and in refrigeration compressors. The result of this liquid is that the individual plates stick to each other and to the stop face of the catcher. This causes the plates to stick to the catcher until the fluid medium, flowing back through the flow channels of the valve in a reverse direction, exerts enough current forces on the plates to detach them from the catcher and from each other. This, in turn, results in a retarded activation and in a delay in the closing process of the valve, the result being that the valve plate is greatly accelerated by the already significantly large current forces, thus resulting a harder impact blow when closing the valve. Since a part of the controlled medium flows back through the valve in a reverse direction due to the delay in closure, the discharge capacity of the compressor is significantly reduced. This fact represents another serious disadvantage.

SUMMARY OF THE INVENTION

The object of the present invention is to provide a compressor valve in which the delay in the closing motion of the plates therein, caused by a liquid such as as oil or coolant, is prevented.

According to the present invention one or more of the elements in the compressor valve includes protrusions to prevent a liquid located therebetween from retarding separation of the elements during a closing motion of the valve. In particular, the protrusions can be provided on the surface of the valve plate which interacts with the associated stop face, or they can be provided on the stop face itself. The protrusions, which are distributed over the interacting surfaces of the valve plate and/or the stop face, as the case may be, can be formed of a metal such as steel, or can be at least partially made of plastic. Each protrusion is separated from its neighboring protrusions by recesses that enclose it. Accordingly, with the valve open the valve plate will not rest against the stop face with its entire surface, but rather only with the protrusions. The recesses form canals around the protrusions, in any event any liquid that is present can run off unimpeded through the canals. This prevents the valve plate from sticking to the catcher and thus causing a delayed closing motion. According to the invention, the closing motion is activated on time before the fluid medium flows back with ill effects through the valve. Not only hard impact blows on the valve seat but also a reduction in the discharge capacity of the compressor are prevented.

The stop face against which the valve plate bears when the valve is open can be formed by the catcher itself. With a valve according to the invention it is also possible to insert between the valve plate and the catcher at least one more plate, e.g. a dampening plate, one or more spring plates, a steering plate, etc., which interact with the stop face of the catcher and which, in turn, form a stop face for the valve plate. These stop faces can have protrusions. Even with this design it is possible for the valve plate itself to have protrusions, and for the additional plate between the valve plate and the catcher to be flat.

In a further development of the invention the additional plate can have protrusions on the side facing the catcher. It can also have protrusions on both of its surfaces, i.e., the surface which faces the catcher and/or the surface which faces the valve plate. The object of these protrusions, which can be made of metal or plastic, is to dampen the impact blow when the individual plates make contact with one another and the impact surface of the catcher; at the same time the individual plates are prevented from sticking to each other and to the catcher.

In a preferred embodiment of the invention the protrusions are in the form of knobby protrusions which are rounded off at their ends with which they make contact with surfaces interacting with them. This measure also serves to improve the shock absorption and to reduce adhesion, which is known to be greatest when smooth, flat surfaces touch one another.

The recesses which separate the individual protrusions from the neighboring protrusions form canals to draw off the liquid so that the effect of clinging by suction is prevented. If, according to another feature of the invention, there are recesses, spaced apart from one another, from the beginning, the concept is largely to prevent a continuous, closed level of liquid on the surface of the valve plate or the related stop face. The existing liquid collects, first of all, in the recesses so that adjacent cross-sectional areas of the recesses are not touched by liquid; the compressed, gaseous medium can flow in and the excess liquid can flow away.

In a simple and suitable embodiment of the invention, the protrusions are arranged consecutively and side by side in rows.

Further details and advantages of the invention will be deduced from the following description of exemplary embodiments, which are shown in the drawings.

DESCRIPTION OF THE DRAWINGS

FIG. 1 is an axial cross-section through a compressor valve constructed according to a first preferred embodiment of the invention;

FIGS. 2 and 3 show, on an enlarged scale, portions of compressor valves constructed according to two other preferred embodiments of the invention;

FIG. 7 shows a cross-sectional view through a portion of a compressor valve constructed according to another preferred embodiment of the invention;

FIGS. 8 and 9 show plan views of portions of valve plates used in two other preferred embodiments of the inventive compressor valve;

FIG. 10 is a cross-sectional view of the valve plate shown in FIG. 8 as seen along X—X;

FIG. 11 is a side view of the valve plate of FIG. 9;

FIGS. 12 and 13 show plan views of portions of valve plates used in two additional preferred embodiments of the inventive compressor valve;

FIG. 14 is an enlarged cross-sectional view of the valve plate shown in FIG. 12 as seen along line XVI—XVI; and FIG. 15 is an enlarged cross-sectional view of the valve plate shown in FIG. 13 as seen along line XV—XV.

DETAILED DESCRIPTION OF THE PREFERRED EMBODIMENTS

Figure 4:
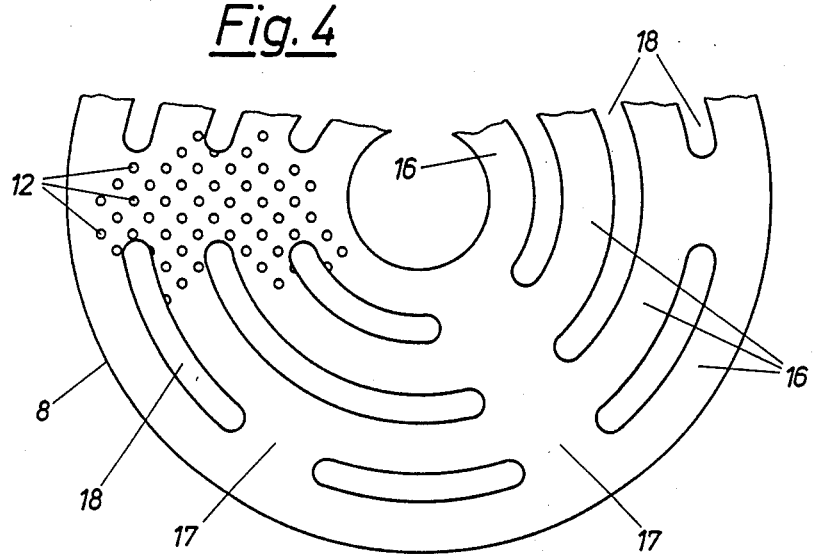
FIG. 4 is a plan view of a valve plate used in the embodiment of compressor valve shown in FIG. 1.

All of the preferred embodiments the compressor valve according to the invention include a valve seat 1 containing flow channels 2 for the fluid medium, and a catcher 3 containing outflow openings 4, the catcher 3 being located at a distance from the valve seat 1 by a guide ring 5. Valve seat 1, catcher 3, and guide ring 5 are securely connected by a central screw 6 with a nut 7. Located in the space between valve 1 and catcher 3 is a valve plate 8, which is loaded against valve seat 1 by closing springs 9 that are supported in the catcher 3. Valve seat 1 provides a packing surface 10 on which the valve plate 8 bears when the valve is closed, the valve plate closing the flow channels 2. In the embodiment shown in FIGS. 1-2, catcher 3 forms an end stop for the lift motion of the valve plate 8 and is provided with a stop face 11 for this purpose. During its lift motion valve plate 8 is guided along the outer surface of the guide ring 5, and when the valve is open the valve plate 8 rests with its top side against the stop face 11.

In the preferred embodiment shown in FIG. 1 the surface of the valve plate 8, which is flat and which interacts with the stop face 11 of the catcher, has knobby protrusions 12 thereon. In the embodiment shown in FIG. 2, however, the knobby protrusions are arranged on the stop face 11 of the catcher, thus contacting the top side of the valve plate 8 which interacts with the stop face. In this embodiment valve plate 8 can be made of plastic or, in the conventional manner, wholly of steel. In the embodiment shown in FIG. 3 the construction shown is different from those shown in FIGS. 1 and 2 insofar as it includes another plate, in particular a dampening plate 13, which extends in parallel with the valve plate 8 and is located between the valve plate 8 and the catcher 3 thereabove. The guide ring 5 has a gradation 14 on which the dampening plate 13 bears so that it is held above the valve plate 8 at a specific distance from catcher 3. The dampening plate 13 is loaded through its own dampening springs 15. During the lift motion, the valve plate 8 in this embodiment strikes with its top surface, first of all, against the dampening plate 13 and then it and the dampening plate move against the catcher 3 until the dampening plate 13 strikes the catcher 3 with its top side. It is evident from FIG. 3 that both the valve plate 8 and the dampening plate 13 have knobby protrusions 12 on their top surfaces.

FIG. 4 is a plan view of valve plate 8 whose top surface is covered with knobby protrusions 12. The valve plate 8 can be made either totally of plastic, or at least the top side can have a layer or coating of plastic which forms the knobby protrusions 12. As indicated in FIG. 4, the protrusions are distributed uniformly over the whole surface of the valve plate 8. They can also be distributed unevenly, e.g., in an arbitrary arrangement. In the embodiment shown in FIG. 4 the valve plate 8 is constructed to have four concentric rings 16 which are connected by radial paths 17. Between rings 16 and paths 17 are annular groups of curved openings 18 for the through flow of the fluid medium. If the valve plate 8 is installed in a valve, e.g., according to FIG. 1, the innermost ring 16 rests with its inner edge against the outer surface of the guide ring 5, so that the valve plate 8 will be centered on the valve seat 1 and guided during a lift motion. As well-known in valve construction, a friction-free guide, however, can be provided with the aid of an elastic steering device.

Figure 5:
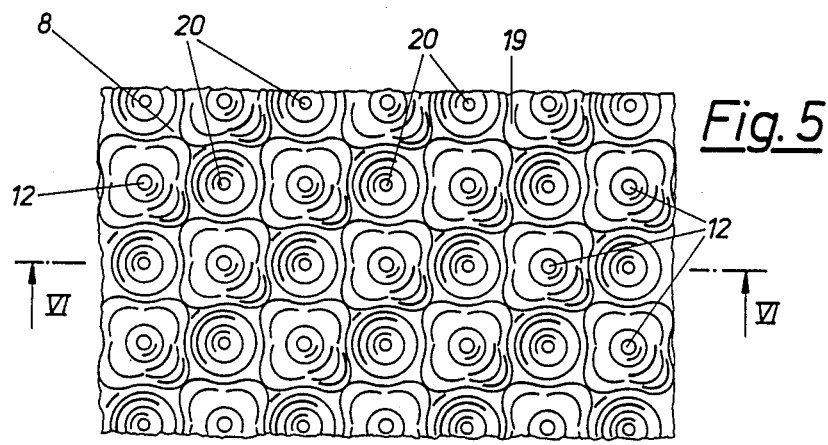
FIG. 5 shows an enlarged fragmentary plan view of the valve plate shown in FIG. 4.
Figure 6:
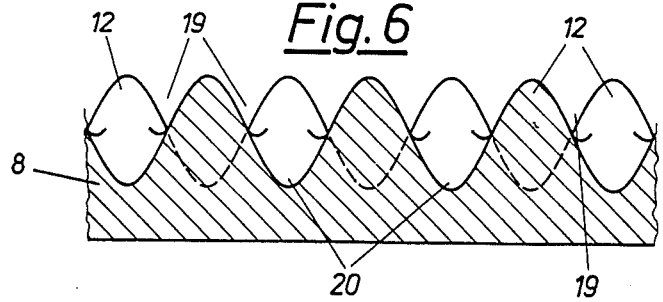
FIG. 6 shows a cross-sectional view of the valve plate as seen along the line VI—VI in FIG. 5.

FIGS. 5 and 6 show enlarged plan and cross sectional views of an advantageous embodiment of knobby protrusions 12. The protrusions 12 are like bumps having rounded ends, as is evident from FIG. 6. There are recesses 19 between the protrusions 12; the protrusions separate the neighboring protrusions 12 from each other. In some places hollows 20 of recesses 19 are provided.

It is evident from the drawings that when the valve is open, the movable plates, i.e., valve plate 8 and dampening plate 13, shown in FIG. 3, rest against the stop face of the catcher 11 and also rest one beneath the other above a surface on which knobby protrusions 12 are arranged. These knobby protrusions 12 prevent the valve plate 8 from adhering by suction to the stop face when liquid is in the valve, e.g., lubricant, or in the case of a refrigerating compressor, a condensed coolant. Due to the knobby protrusions 12 the liquid can drain out in the recesses 19 around the protrusions, thus preventing sticking by suction. Small quantities of liquid can collect in the hollows 20. In any event, fluid medium can penetrate through the canals, formed by the recesses 19, between the respective stop face and the valve plate 8 so that the valve plate is always detached in due time from the catcher 3 because of the action of the closing springs 9 and is moved back to the valve seat 1. Thus the medium flowing back through the valve does not increase the closing force on the valve plate 8 and cause hard impact blows on the valve seat 1. Furthermore, an injurious reflux of the fluid medium in the reverse direction through the valve is prevented so that the discharge capacity is not reduced because of a delayed closing of the valve.

FIG. 7 shows a partial axial cross-section of a compressor valve which is somewhat similar to that shown in FIG. 3; however, the additional damping plate 13 has an undulatory shape, thus forming protrusions 12 and trough-like recesses 19 between the protrusions. As such, when the valve is open, the contact surfaces between the valve plate 8, the damping plate 13 and the catcher 3 will not have the same corresponding shape, but will be separated by alternating protrusions 12 and recesses 19.

There are many ways of accomplishing the undulatory formation of the additional plate 13. The waves, which form the protrusions 12, can run parallel to one another in a straight line over the plate; they can be concentric about the axis of the valve, or they can extend radially. Irregular arrangements, e.g., waves that have irregular shapes and sizes, are also possible.

The contact surfaces can also be interrupted by such formations as shown in FIGS. 8 to 11. According to FIG. 8, the protrusions 12 are shaped like ribs, whereby the recesses 19 between the rib-shaped protrusions 12 form canals. The protrusions 12 run parallel to one another over the entire surface of the valve plate 8. In the embodiment shown in FIG. 9 the protrusions 12 are arranged radially on the valve plate 8. Each ring 16 of the valve plate 8 is independent of the other rings 16 and is provided with protrusions 12, which are arranged approximately radially. Both the protrusions 12 and the recesses 19 can vary in width. In the depicted embodiment there are no protrusions 12 in the region of the radial paths 17 connecting several rings 16. Thus the flat surface can serve to mount springs. It should be noted that any arbitrary arrangement and distribution of rib-shaped protrusions 12 over the surface of the valve plate 8 is possible. FIGS. 10 and 11 show the shaping of the alternating protrusions 12 and recesses 19, respectively.

In the embodiment shown in FIG. 12 the protrusions 12 are ribs distributed concentrically over the valve plate 8, terminating in the region of the rings 16 of the valve plate 8. On the other hand, FIG. 13 shows an embodiment in which the protrusions 12 form protective ribs around the curved openings 18 in the valve plate 8. The recesses 19 are located between the protrusions 12, as shown in the cross-section of the area of an opening 18 in FIGS. 14 and 15, respectively. In order to prevent the recesses 19 from forming closed spaces or basins in which liquid can collect when the valve is open, by-pass slits 21 are arranged in several locations of the rib-shaped protrusions 12; the by-pass slits forming a connection to the periphery of the plate. In order to meet the respective requirements, there can even be an arbitrary size, and they may be located at arbitrary points on the valve plate 8.

The described exemplary shapes of the protrusions 12 and canal-shaped recesses 19 that are arranged between the protrusions can be provided on all surfaces of the valve which make contact with one another when the valve is open, in particular on the surface of the valve plate 8 facing the catcher 3, at the stop face 11 of the catcher 3, and on both sides of the additional plate 13, if such a plate is provided. The rib-shaped protrusions and the recesses can also be arranged in any arbitrary cutting arrangement. They can be manufactured by stamping or milling, or, if they are made of plastic, also by a casting process.

I claim:

1. In a compressor valve that includes a valve seat which has flow channels therethrough for a fluid medium and which provides a packing surface; a catcher which is positioned in spaced relation to the packing surface of said valve seat; a valve plate which is positionable against the packing surface of the valve seat to close the flow channels in the valve seat and is movable away from the packing surface and toward the catcher to open the flow channels, the valve plate having a first surface facing the valve seat and an opposite second surface facing the catcher; and a stop face for contacting the second surface of the valve plate and arresting its movement away from the valve seat, the improvement wherein at least one of said second surface of said valve plate and said stop face includes a plurality of protrusions and recesses between the protrusions.

2. The compressor valve as claimed in claim 1, wherein said stop face is provided on said catcher.

3. The compressor valve as claimed in claim 2, wherein said protrusions and recesses are located on said stop face.

4. The compressor valve as claimed in claim 1, wherein said protrusions and recesses are located on said second surface of said valve plate.

5. The compressor valve as claimed in claim 4, wherein said valve plate has an outer periphery, and wherein at least some of said recesses form canals which extend to said outer periphery.

6. The compressor valve as claimed in claim 4, wherein said protrusions are in the form of bumps having rounded ends.

7. The compressor valve as claimed in claim 4, including an additional plate movably located between said valve plate and said catcher, said additional plate having a first surface facing said valve plate and a second surface facing said catcher; and wherein said stop face is provided on said first face of said additional plate.

8. The compressor valve as claimed in claim 7, wherein said second surface of said additional plate also includes protrusions and recesses.

9. The compressor valve as claimed in claim 1, including an additional plate movably located between said valve plate and said catcher, said additional plate having a first surface facing said valve plate and a second surface facing said catcher; wherein said stop face is provided on said first face of said additional plate; and wherein said protrusions and recesses are located on said stop face.

10. The compressor valve as claimed in claim 9, wherein said second surface of said additional plate also includes protrusions and recesses.

11. The compressor valve as claimed in claim 10, wherein said additional plate has an undulating configuration, thus providing the protrusions and recesses on the first and second surfaces thereof.

12. The compressor valve as claimed in claim 1, wherein said valve plate is generally disc-shaped, wherein said stop face is circular, and wherein said protrusions are arranged in rows.

13. The compressor valve as claimed in claim 12, wherein said rows are radially oriented.

14. The compressor valve as claimed in claim 12, wherein said rows are parallel to one another.

15. The compressor valve as claimed in claim 1, wherein said valve plate is generally disc-shaped, wherein said stop face is circular, and wherein said protrusions are in the form of ribs that are concentrically located relative to one another.

16. The compressor valve as claimed in claim 15, wherein said valve plate includes concentric groups of curved openings therein, and wherein said ribs are located on the second surface of said valve plate between said concentric groups of curved openings.

17. The compressor valve as claimed in claim 1, wherein said valve plate is generally disc-shaped, wherein said valve plate includes concentric groups of curved openings therein, and wherein said ribs are in the form of rib groups which are located on said second surface of said valve plate and around respective curved openings, each rib group including by-pass slits therein.

18. The compressor valve as claimed in claim 1, wherein said protrusions are made at least in part of plastic.

19. The compressor valve as claimed in claim 1, including hollows between some of said protrusions.

* * * * *